US011218497B2

(12) United States Patent
Bania et al.

(10) Patent No.: US 11,218,497 B2
(45) Date of Patent: Jan. 4, 2022

(54) REPORTING BEHAVIOR ANOMALIES

(71) Applicant: HEWLETT PACKARD ENTERPRISE DEVELOPMENT LP, Houston, TX (US)

(72) Inventors: Tomasz Jaroslaw Bania, Mountainview, CA (US); William G. Horne, Lawrenceville, NJ (US); Pratyusa K. Manadhata, Piscataway, NJ (US); Tomas Sander, New York, NY (US)

(73) Assignee: Micro Focus LLC, Santa Clara, CA (US)

( * ) Notice: Subject to any disclaimer, the term of this patent is extended or adjusted under 35 U.S.C. 154(b) by 836 days.

(21) Appl. No.: 15/437,230

(22) Filed: Feb. 20, 2017

(65) Prior Publication Data
US 2018/0241761 A1   Aug. 23, 2018

(51) Int. Cl.
*H04L 29/06*   (2006.01)

(52) U.S. Cl.
CPC ................. *H04L 63/1425* (2013.01)

(58) Field of Classification Search
CPC .......... H04L 63/1425; H04L 63/0272
See application file for complete search history.

(56) References Cited

U.S. PATENT DOCUMENTS

| 8,468,606 | B2* | 6/2013 | Van De Weyer | ..... G06F 21/554 |
| | | | | 713/187 |
| 9,888,024 | B2* | 2/2018 | Roundy | ................ G06F 21/552 |
| 2004/0199576 | A1 | 10/2004 | Tan | |
| 2010/0083054 | A1 | 4/2010 | Marvasti | |
| 2011/0107418 | A1 | 5/2011 | Bhagwan et al. | |
| 2012/0137367 | A1 | 5/2012 | Dupont et al. | |
| 2014/0215608 | A1* | 7/2014 | Rajagopalan | ........... H04L 63/00 |
| | | | | 726/22 |
| 2015/0033086 | A1 | 1/2015 | Sasturkar et al. | |
| 2015/0195299 | A1* | 7/2015 | Zoldi | .................. H04L 63/1433 |
| | | | | 726/25 |
| 2017/0134415 | A1* | 5/2017 | Muddu | ............... H04L 63/1425 |
| 2017/0251012 | A1* | 8/2017 | Stockdale | ........... H04L 63/1441 |

OTHER PUBLICATIONS

M. Logaprakash, "False Alert Reduction and Correlation for Attack Scenarios with Automatic Time Window," International Journal of Computer Science and Information Technology & Security, 2012, pp. 147-151, vol. 2, No. 1.

* cited by examiner

*Primary Examiner* — Benjamin E Lanier

(57) ABSTRACT

A technique includes determining relations among a plurality of entities that are associated with a computer system; and selectively grouping behavior anomalies that are exhibited by the plurality of entities into collections based at least in part on the determined relations among the entities. The technique includes selectively reporting the collections to a security operations center.

15 Claims, 6 Drawing Sheets

REPORTING BEHAVIOR ANOMALIES

BACKGROUND

An enterprise may employ a system of software and services, called a "security information and event management (SIEM) system," for purposes of detecting and responding to security events that occur with the enterprise's computer system. In this manner, the SIEM may monitor operations of the computer system (logon failures, communications with blacklisted domains, and so forth) for purposes of generating corresponding security alerts. A security operations center (SOC) of the enterprise may include a relatively large staff for purposes of addressing the security alerts. In this manner, analysts at the SOC may investigate the security alerts by manually gathering information about the users and devices that are mentioned in the alerts for such purposes as identifying alerts of concern and determining the appropriate remediation actions for these identified alerts.

DETAILED DESCRIPTION

Figure 1:
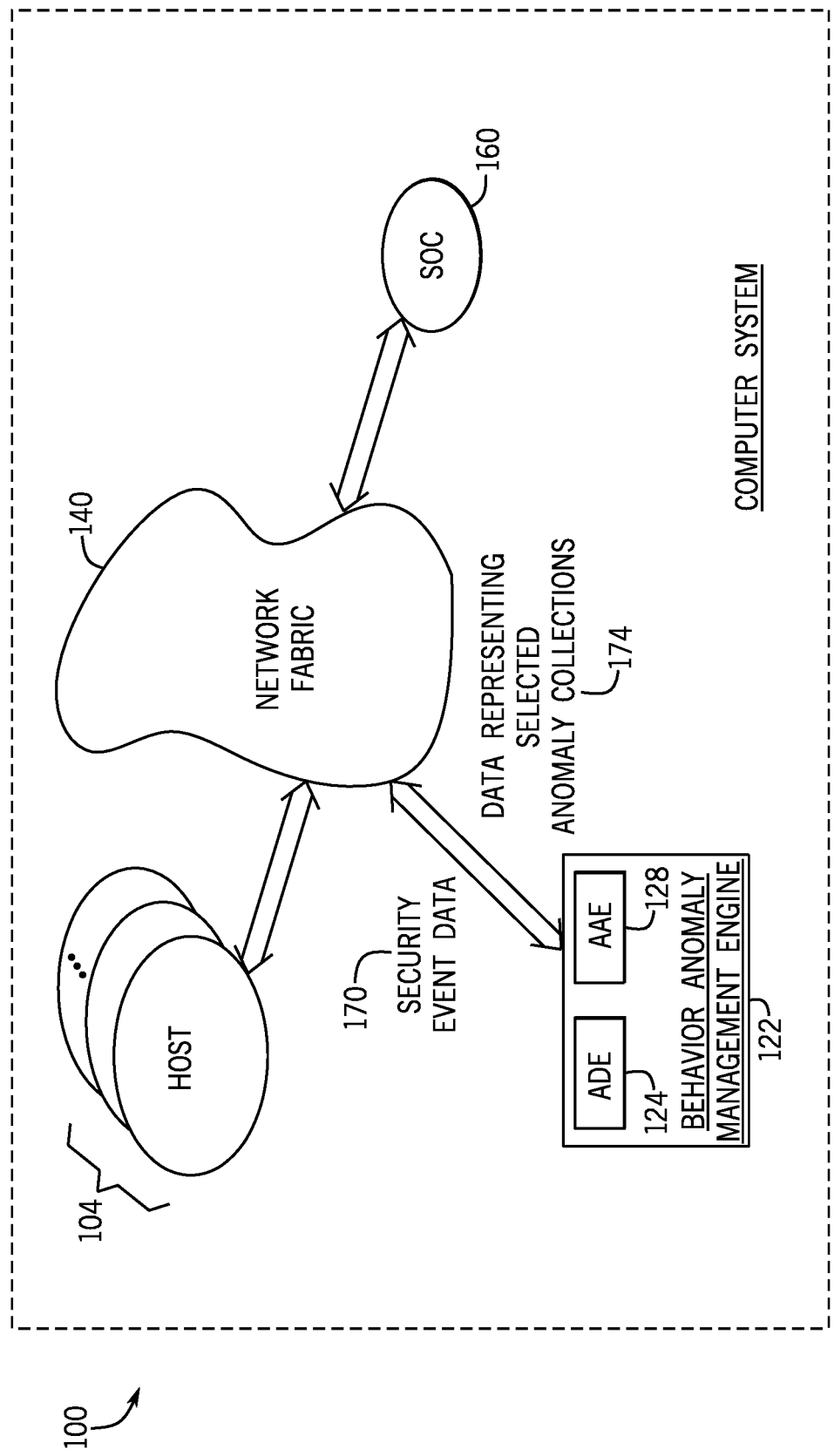
FIG. 1 is a schematic diagram of a computer system according to an example implementation.

A security operation center (SOC) for an enterprise may contain a relatively large staff to monitor and address security alerts, which may be generated by the enterprise's security information and event management (SIEM) system. In this manner, the SIEM system may generate security alerts based on the analysis of collected, or logged, event data. Event data may range in the billions per day, whereas the security alert data, i.e., the data that is reported to the SOC, may range in the hundreds per day. Keeping up with such a large number of security alerts may be challenging, even for a highly-staffed SOC.

In accordance with example systems and techniques that are described herein, security event data is analyzed on a computer system for purposes of identifying behavior anomalies that are exhibited by entities that are associated with a computer system. In this context, an "entity" refers to a thing that exists by itself and has one or multiple characteristics. As examples, an entity may be a human, such as a user of the computer system; an electronic device, such as a computer; a phone or network switch; an address associated with an electronic device or a resource, such as an Internet Protocol (IP) address, a domain name or a uniform resource locator (URL); and so forth.

A "behavior anomaly" (also referred to as an "anomaly" herein) refers to a behavior that is an outlier (either statistically or otherwise), with respect to a baseline behavior. As examples, the baseline behavior for a given entity may be a particular historic behavior that is associated with the entity. For example, for the case in which an entity is a computer, a historic average rate of outgoing data that is communicated by the computer may be considered a baseline behavior. The baseline behavior may be a behavior that is determined from other peers. For example, for the case in which an entity is a user, the logon failure rates by other users of the same work group, for example, may be considered to be a baseline behavior. For the case in which an entity is a computer, the outgoing data rates by computers of the same work group may be considered to be a baseline behavior, and as another example for the case in which an entity is a computer, a baseline behavior may be the number of communications with blacklisted domains (i.e., known malicious domains) by computers that are associated with the same project.

A wide range of behaviors may be monitored or observed (through logged security event data, for example) for purposes of identifying behavior anomalies. Examples of behavior anomalies may be a relatively high number of failed logins, a relatively high number of domain name system (DNS) queries, a relatively high number of Hypertext Transfer Protocol (HTTP) queries to blacklisted websites, a relatively high number of outgoing data bytes, and so forth.

In general, a behavior anomaly is not a direct indication of a compromised entity, but rather, the behavior anomaly is a "weak indicator," as the behavior anomaly indicates, or represents, a behavior that may potentially be associated with a compromised entity. As such, the detection or identification of a behavior anomaly, should not, in many cases, trigger a security alert, but rather, being a weak indicator, the behavior anomaly may eventually (albeit not immediately) be reviewed by a security analyst. It is noted that a security analyst may, in accordance with example implementations, designate certain sources (certain threat intelligent sources, for example) as being sources of weak indicators.

As can be appreciated, the number of detected or identified behavior anomalies may vastly exceed the number of detected security breaches or compromises. Therefore, it may be infeasible to merely pass through all detected or identified behavior anomalies to an SOC, as such an approach may overwhelm even a large, highly trained staff. In accordance with example implementations that are described herein, a behavior anomaly management engine correlates and aggregates weak indicators, such as, behavior anomalies, to selectively generate bundles, or collections, of weak indicators. Moreover, as described herein, the behavior anomaly management engine may selectively report the collections to the SOC in a controlled manner so that the SOC may better manage and address the reported weak indicators that are contained in the reported collections.

More specifically, in accordance with example implementations, a technique includes identifying weak indicators, such as behavior anomalies that are exhibited by entities that are associated with a computer system; determining connections among the entities; and selectively grouping, or bundling, the identified anomalies based at least in part on the determined connections. Moreover, in accordance with example implementations, not all of the collections may be reported to the SOC, but rather, the technique includes, in accordance with example implementations, selectively reporting the collections to the SOC. This selective reporting may involve, as further described herein, assessing aggregate scores for the collections so that a given collection may be reported to the SOC when its aggregate score exceeds a predefined threshold.

As a more specific example, FIG. 1 depicts a computer system 100 in accordance with some implementations. In general, the computer system 100 includes one or multiple hosts 104, which, in general may be processor-based electronic devices, such as computers, tablet computers, thin clients, clients, servers, desktop computers, notebook computers, smartphones, and so forth. In general, a given host 104 may be associated with one or multiple entities, such as one or multiple users, IP addresses, one or multiple other hosts 104, and so forth. Certain hosts 104 may be associated with certain data centers of the computer system 100, certain workgroups, certain projects, and so forth. Moreover, users of the hosts 104 may be associated with certain projects, workgroups, data centers, and so forth.

In general, the hosts 104 may communicate with each other and communicate with devices inside and outside of the computer system 100 via network fabric 140. In general, the network fabric 140 may be a private network fabric, a public network fabric, a combination of public and private network fabrics, and so forth. It is noted that various implementations of the computer system 100 are contemplated. For example, the computer system 100 may be disposed at a single geographical location; may be distributed at several geographical locations; may be located partially or entirely within a public, private or hybrid cloud; and so forth.

The computer system 100 may include a behavior anomaly management engine 122, which analyzes logged, or collected, security event data 170 for purposes of identifying anomalous behaviors that are exhibited by the entities that are associated with the computer system 100. As examples, the entities may include users, electronic devices (computers, and so forth), internet protocol (IP) addresses, domain names, uniform resource locators (URLs), and so forth. In accordance with example implementations, the behavior anomaly management engine 122 may perform security analytics on collected event data. The network data sources that are analyzed to produce the security event data 170 may include, as examples, hypertext protocol (HTTP) logs, domain name service (DNS) logs, virtual private network (VPN) logs, netflow traffic, intrusion detection system (IDS) logs, and so forth. In accordance with example implementations, the security event data may be derived from system devices. In accordance with example implementations, the security event data may be derived from system logs or from an endpoint management tool.

The behavior anomaly management engine 122, in accordance with example implementations, generates or determines baseline behavior for entities that are associated with the computer system 100, and then, using the baseline behavior, looks for deviations from the baseline behaviors to detect or identify behavior anomalies. In general, behavior anomalies may include, for example, a relatively high number of failed logins, a relatively high number of DNS queries, a relatively high number of HTTP queries to blacklisted websites, a relatively high number of outgoing bytes, and so forth. In general, the baseline behaviors may be determined from analyzing the historic behaviors of entities, observing behaviors of peers related to a given entity, and so forth. Depending on the particular implementation, the anomaly management engine 122 may employ such tactics as time series analysis, statistical comparisons, graph analytics, and so forth, for purposes of determining baseline behaviors and identifying behavior anomalies.

The behavior anomalies that are identified by the behavior anomaly management engine 122 are, in general, weak indicators of undesired behaviors. For example, a time series analysis may be used by the behavior anomaly management engine 122 for purposes of flagging behavior in which a given device is uploading more data than the device has uploaded in the past. As another example, the behavior anomaly management engine 122 may apply peer group analysis to identify an anomaly in which a server is connecting to more outside IP addresses and domains than other servers in the same data center (i.e., as other peer devices).

The computer system 100 may have a relatively large number of users and devices (on the order of thousands of users and possible many more devices, for example). Moreover, each entity may generate several anomalies in a single day. In accordance with example implementations that are described herein, the behavior anomaly management engine 122 does not generate an alert for each identified behavior anomaly or report each behavior anomaly to an SOC 160. Rather, in accordance with example implementations, the behavior anomaly management engine 122 combines weak alerts, such as behavior anomalies, into groups called "collections" and selectively reports the collections (i.e., reports some collections and does not report others) in a fashion that allows a sensible number of identified weak indicators (a number less than one tenth of the total number of identified behavior anomalies, for example) to be reported the SOC 160.

In accordance with some implementations, the behavior anomaly management engine 122 may include an anomaly detection engine 124 that identifies behavior anomalies for entities associated with the computer system 100; and an anomaly analysis engine 128, which selectively groups these identified anomalies into collections and selectively reports the collections to the SOC 160 (in the form of data 174 communicated over the network fabric 140, for example).

As a more specific example, in accordance with some implementations, the anomaly analysis engine 128 groups, or collections, the identified behavior anomalies so that behavior anomalies that are associated with "related" entities are grouped together. More specifically, in accordance with example implementations, the anomaly analysis engine 128 looks for a "connected" relationship among or between entities so that the behavior anomalies associated with the connected entities are grouped, or bundled, together. For example, in accordance with example implementations, a user, one entity, may be "connected to" a device, another entity, if the user has logged onto the device. As another example, the anomaly analysis engine 128 may consider a device, one entity, to be connected to an IP address, another entity, if the IP address has been assigned to the device.

In accordance with further example implementations, the anomaly analysis engine 128 may consider other notions of relations other than connections, including relationship rules that are predefined by a security analyst or other person. For example, in accordance with some implementations, the anomaly analysis engine 128 may consult a predefined list, which contains data identifying devices that belong to the same data center, and for these example implementations, the anomaly analysis engine 128 may consider all of the devices of the particular data center as being "related." As another example, in accordance with some implementations, the anomaly analysis engine 128 may retrieve a list that contains data identifying all users that work on the same project, and for this example implementation, these users may all be considered to be related to each other. Moreover, the user may be all considered to be related to their associated computers, as well as be considered to be related to the computers that are associated with other users that work on the same project.

As a more specific example, a given collection of behavior anomalies that is generated by the anomaly analysis engine 128 may be a collection that shows that 10 users in a research and development office have clicked on spam emails, and the collection may further show that devices that are connected to these users are connecting to a group of blacklisted websites.

Figure 2:
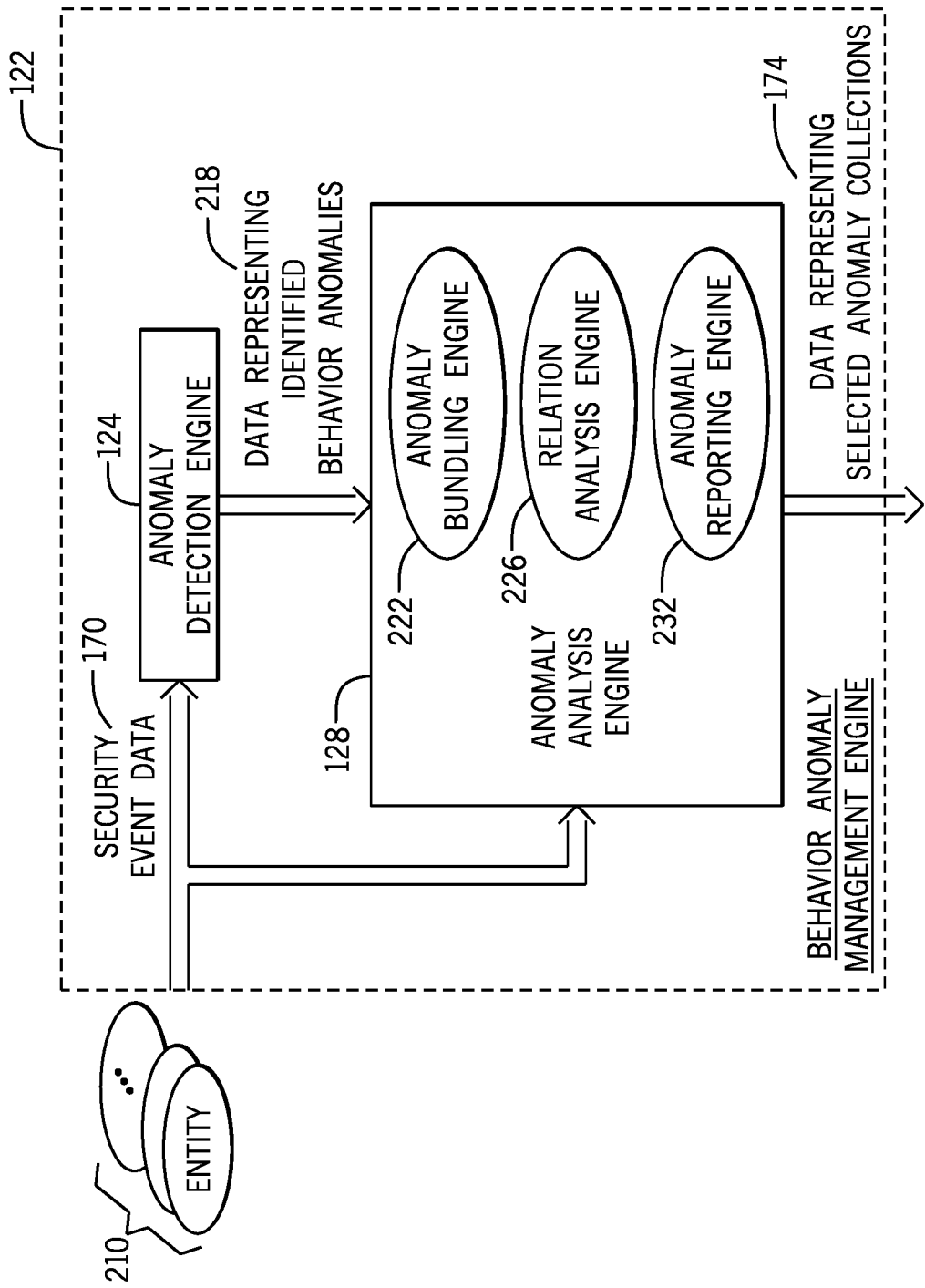
FIG. 2 is a schematic diagram of an anomaly analysis engine of the computer system of FIG. 1 according to an example implementation.

Referring to FIG. 2 in conjunction with FIG. 1, in accordance with some implementations, the anomaly analysis engine 128 may contain an anomaly bundling engine 222, a relation analysis engine 226 and an anomaly reporting engine 232. In this manner, the anomaly detection engine 124 may analyze security event data 170 associated with a plurality of entities 210 for purposes of generating data 218 that represents identified behavior anomalies. The anomaly bundling engine 222 may selectively group the identified behavior anomalies based on relations that are identified by the relation analysis engine 226. The anomaly reporting engine 232 may generate data 174, which represents selected anomaly collections for reporting to the SOC 160.

Figure 3:
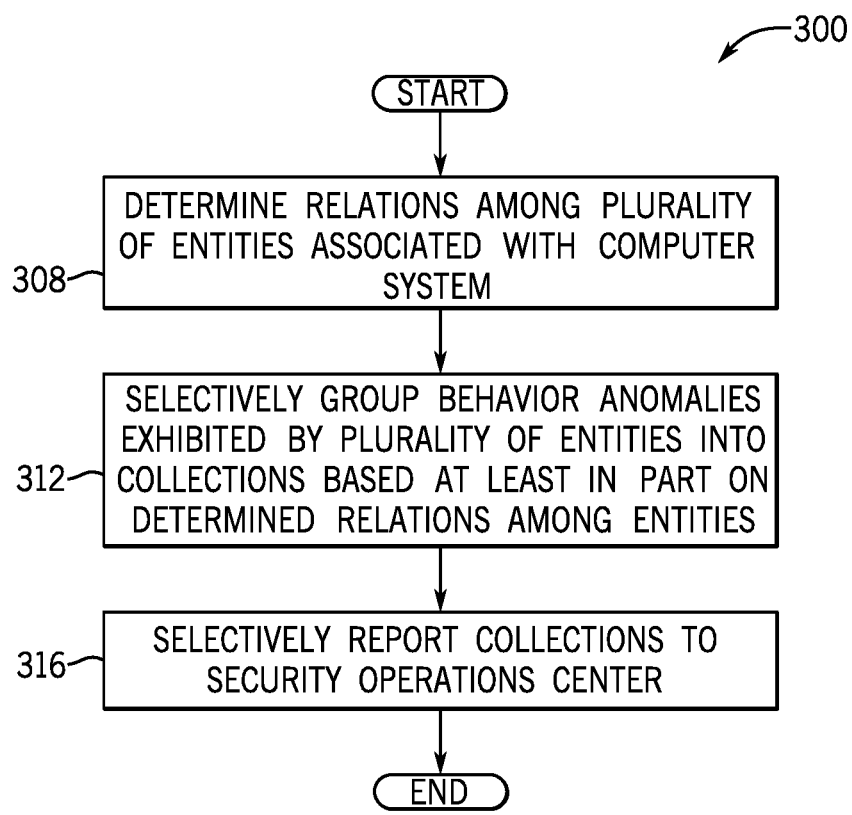
FIGS. 3 and 4 are flow diagrams depicting techniques to collection and report behavior anomalies according to example implementations.

To summarize, in accordance with example implementations, a technique 300 that is depicted in FIG. 3 includes determining (block 308) relations among a plurality of entities that are associated with a computer system and selectively grouping (block 312) behavior anomalies that are exhibited by the plurality of entities into collections based at least in part on the determined relations among the entities. The technique 300 includes selectively reporting the collections to a security operations center, pursuant to block 316.

Referring back to FIG. 2, in accordance with some implementations, the anomaly reporting engine 232 may determine which collections of behavior anomalies to report to the SOC 160 based at least in part on scores that are associated with the collections. More specifically, in accordance with some implementations, the anomaly reporting engine 232 determines an aggregate score for each collection in a process that includes 1. determining one or multiple scores for each behavior anomaly in the collection; and 2. combining the determined scores for the behavior anomalies to derive the aggregate score. The anomaly reporting engine 232 may compare the aggregate collection scores to a predefined threshold (a threshold set by a security analyst, for example), so that, in accordance with example implementations, the engine 232 reports the collections to the SOC 160, which meet or exceed the predefined threshold.

As a more specific example, in accordance with some implementations, the anomaly reporting engine 232 determines the scores for the behavior anomalies based at least in part on information that is provided by the anomaly detection engine 124. In this manner, in accordance with example implementations, the anomaly detection engine 124 provides a confidence score and a risk score for each behavior anomaly. In general, the confidence score is a measure of the anomaly detection engine's confidence that the anomaly is a true positive (i.e., an actual anomaly). For example, in accordance with some implementations, the anomaly detection engine 124 may provide a confidence score within the range of 0 to 1. The anomaly detection engine 124 may also, in accordance with example implementations, provide a risk score for each identified behavior anomaly. In general, the risk score represents a potential security impact associated with the anomaly. For example, some behavior anomalies may bear higher correlations to high impact security threats than other behavior anomalies. In accordance with example implementations, the risk score may be with a range of 0 to 1.

In accordance with some implementations, the anomaly reporting engine 232 combines the confidence and risk scores of the behavior anomalies of a given collection to derive the aggregate score for the collection. Depending on the particular implementation, the anomaly reporting engine 232 may combine these scores using any of techniques, such as a simple normalized summation, a weighted summation, a statistical combination, a probabilistic combination, and so forth.

Figure 4:
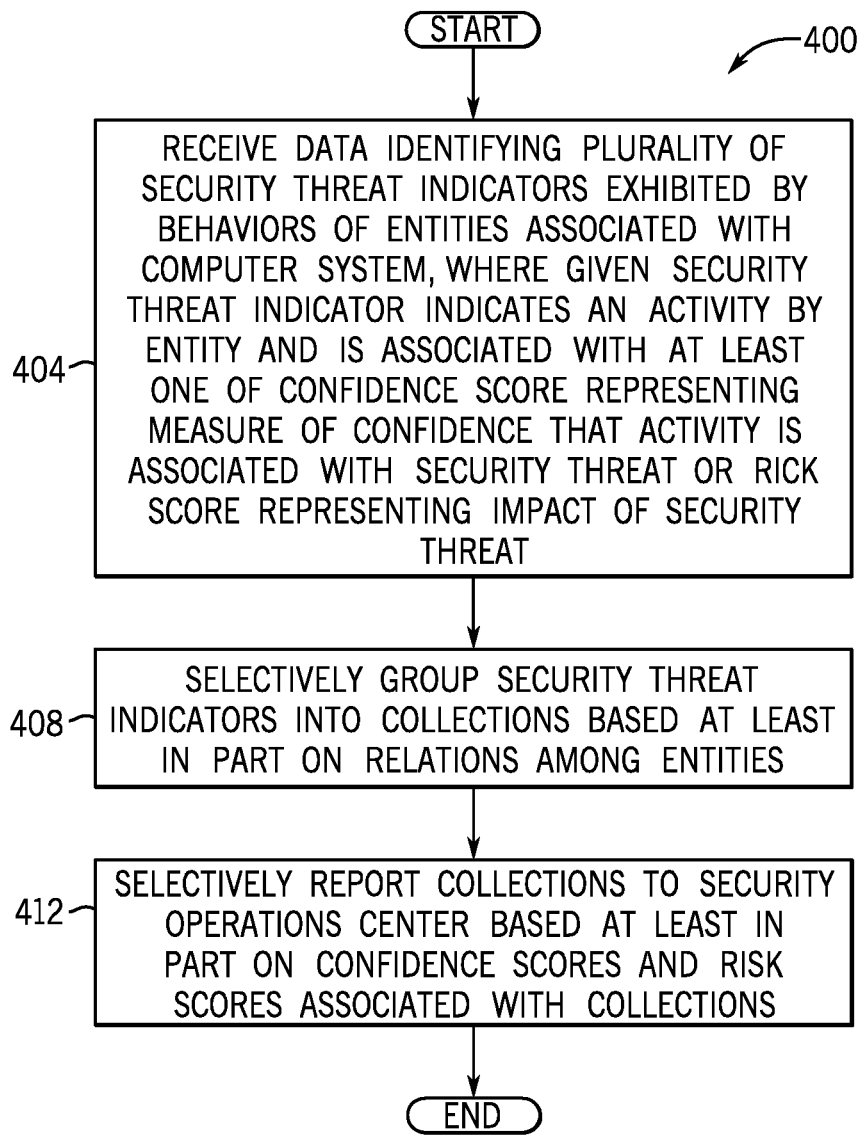

Thus, referring to FIG. 4, in accordance with example implementations, a technique 400 includes receiving (block 404) data that identifies a plurality of security threat indicators (behavior anomalies, for example) that are exhibited by behaviors of a plurality of entities that are associated with a computer system. A given security threat indicator indicates an activity by an entity of the plurality of entities and is associated with at least one of a confidence score that represents a measure of confidence that the activity is associated with a security threat or a risk score that represents an impact of the security threat. The technique 400 includes selectively grouping (block 408) the identified security threat indicators into collections based at least in part on relations among the entities. Moreover, the technique 400 includes selectively reporting (block 412) the collections to a security operations center based at least in part on the risk and confidence scores that are associated with the collections.

Figure 5:
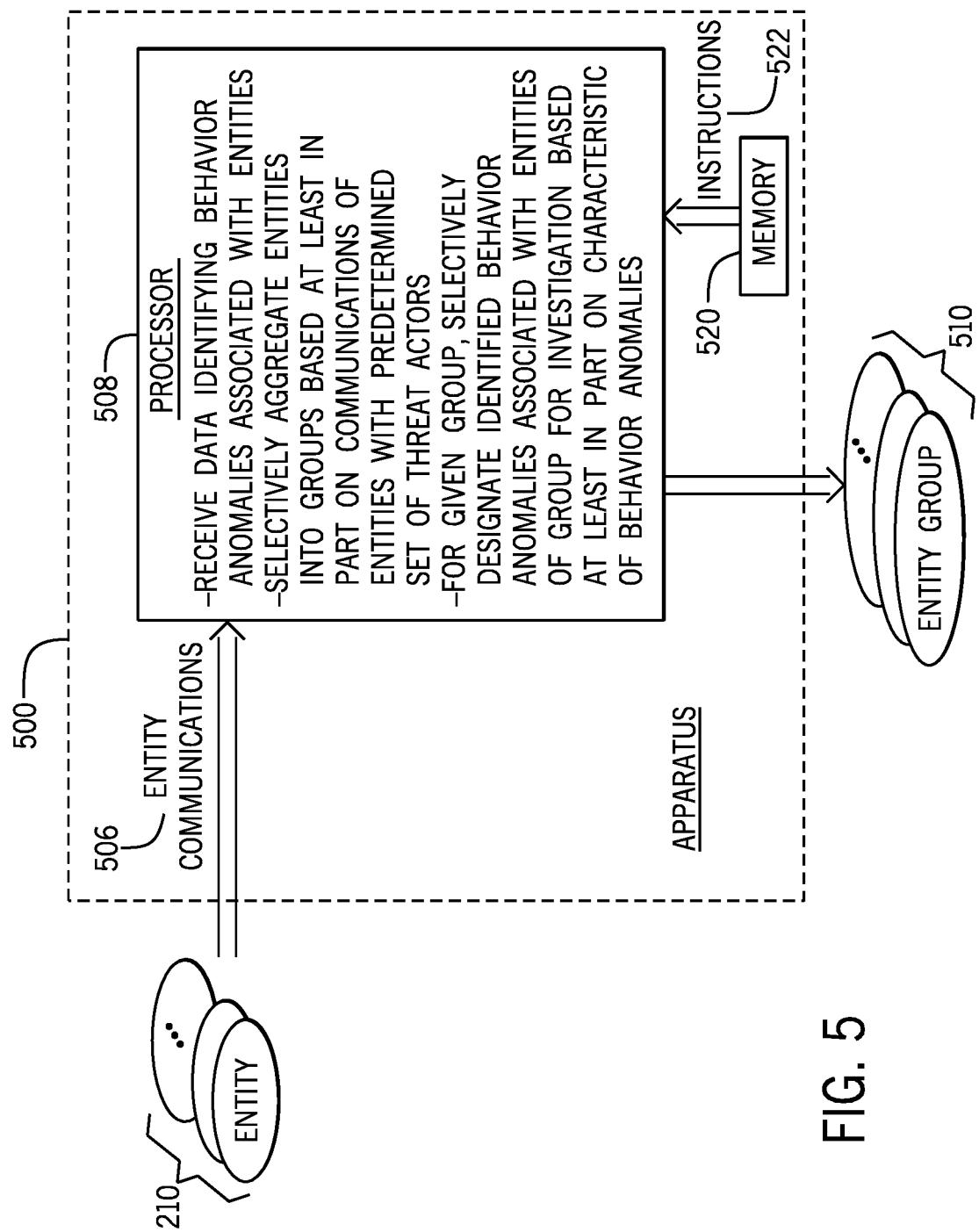
FIG. 5 is a schematic diagram of an apparatus to selectively designate identified behavior anomalies for investigation according to an example implementation.

Referring to FIG. 5, in accordance with further example implementations, an apparatus 500 may cross-correlate behavior anomalies associated with a particular set of entities (a set of hosts, users and so forth, as examples) for purposes of determining whether these anomalies should be bundled, or grouped, as a collection so that further action (reporting of the collection, designation of the collection for further investigation, and so forth) may be taken. More specifically, in accordance with example implementations, the apparatus 500 may include a memory 520 and a processor 508 (one or multiple central processing units (CPUs), one or multiple CPU processing cores, and so forth). The memory 520 stores instructions that when executed by the processor 508, causes the processor 508 to receive data that identifies behavior anomalies that are associated with entities 210 of a computer system and selectively aggregate the entities 210 into groups.

As a more specific example, in accordance with some implementations, the processor 508 may identify a set of M physical machines that are related (e.g., connected) in some way and then determine whether "unusually many" behavior anomalies are associated with these M machines. For example, the processor 508 may identify a set of M machines that are related due to the machines all communicating with a particular threat actor's website. In response to determining that "unusually many" behavior anomalies are associated with the set of M machines, the processor 508 may, for example, report these behavior anomalies to the SOC or may, in general, designate the associated entities as a collection for further analysis. Thus, in general, the instructions 522 when executed by the processor 508 causes the processor 508 to selectively aggregate entities 210 into groups 510 based at least in part on relations and for a given group 510, selectively designate identified behavior anomalies associated with entities of the group 510 for investigation based at least in part on a characteristic of the behavior anomalies.

As a more specific example, in accordance with some implementations, the processor 508 may determine whether a given entity group 510 exhibits "unusually many" behavior anomalies by comparing the ratio of behavior anomalies to the number of machines. As another example, in accordance with some implementations, the processor 508 may determine whether there are a number of common anomalies, i.e., anomalies shared by machines of the group 510, in which the machines have unusually high levels of data being transferred in outgoing connections. In accordance with further example implementations, the processor 508 may aggregate the entities into groups based on a set of entities defined by a security analyst. Thus, many implementations are contemplated, which are within the scope of the appended claims.

In accordance with further example implementations, an apparatus may group, or bundle, weak indicators, such as behavior anomalies using a time-based aggregation. For example, in accordance with some implementations, all of the identified anomalies for a given entity may be grouped based on a specified time window. This allows an investigation scenario, for example, in which all of the anomalies for a given entity may be viewed on the entity's profile.

Figure 6:
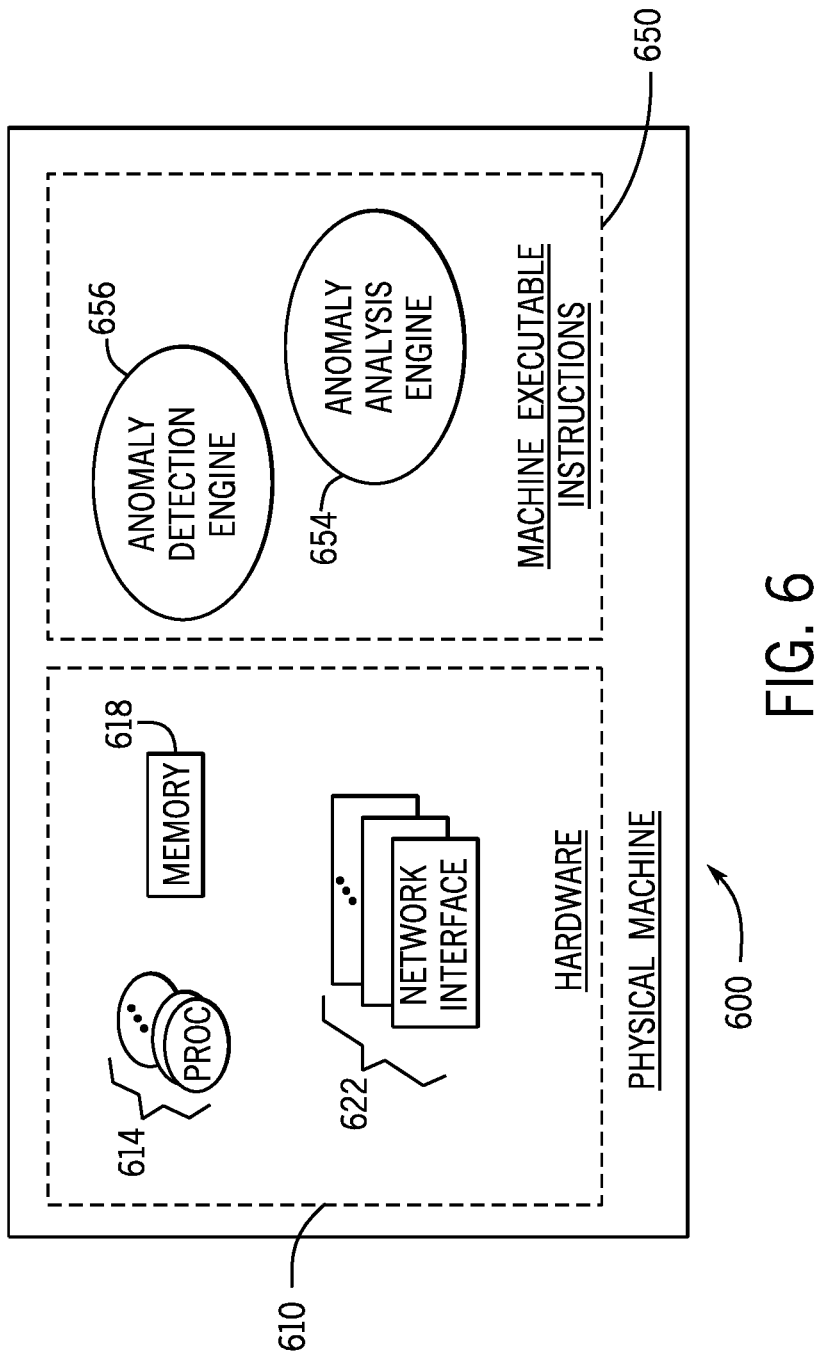
FIG. 6 is a schematic diagram of a physical machine according to an example implementation.

Referring to FIG. 6, in accordance with some implementations, the apparatuses and systems that are described herein as well as apparatuses and systems that may perform the techniques that are described herein may be formed at least in part by an actual, physical machine 600 that is made up of actual hardware 610 and machine executable instructions 650, or "software." It is noted that although FIG. 6 depicts the physical machine 600 as being contained in a box, the physical machine 600 may have a number of implementations. As examples, the physical machine 600 may represent one or multiple computing devices that may, for example, be disposed at a single geographical location, may be distributed at multiple geographical locations, and so forth.

In accordance with some implementations, the hardware 610 may include one or multiple processors 614 (one or multiple central processing units (CPUs), one or multiple CPU cores, and so forth). The hardware 610 may include a memory 618, which may, for example, store data representing one or more of the following: identified behavior anomalies; weak indicators; lists of entities that are considered to be connected or related; rules to be applied to bundle, or group, identified behavior anomalies as a collection; rules to be applied to designate groups across which associate behavior anomalies are correlated; rules to be applied to determine baseline behaviors; rules to be applied in accessing scores for collections of weak indicators or identified anomalies; rules for selecting which collections are reported to the security operations center; lists identifying entities whose weak indicators or identified behavior anomalies are to be grouped, or bundled, into collections; thresholds to consider whether the anomalies of a given collection are considered to be unusually large; and so forth. Moreover, the memory 618 may contain instructions that, when executed, perform one or more of the techniques that are described herein, such as, for example, techniques 300 (FIG. 3) and/or 400 (FIG. 4).

In general, the memory 618 may be a non-transitory memory that may be formed from, as examples, semiconductor storage devices, memristors, magnetic storage devices, phase change memory devices, a combination of one or more of these storage technologies, and so forth, depending on the particular implementation.

In accordance with some implementations, the hardware 610 of the physical machine 600 may include various other components, such as, for example, one or multiple network interfaces 622, input/output (I/O) devices, a display, and so forth.

In accordance with some implementations, the machine executable instructions 650 may include, for example, instructions 656 that when executed by the processor(s) 614, cause the processor(s) 614 to form an anomaly detection engine; instructions 654 that when executed by the processor(s) 614 cause the processor(s) 614 to form an anomaly analysis engine; and so forth.

In accordance with further example implementations, all or part of the above-described processor-based architecture may be replaced by dedicated, hardware circuitry or by one or multiple Application Specific Integrated Circuits (ASICs). For example, in accordance with some implementations, all or part of the anomaly detection engine and/or the anomaly analysis engine may be formed from one or multiple ASICs. Thus, many implementations are contemplated, which are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   determining relations among a plurality of entities associated with a computer system;
   selectively grouping behavior anomalies exhibited by the plurality of entities into collections based at least in part on the determined relations among the plurality of entities; and
   selectively reporting the collections to a security operations center.

2. The method of claim 1, wherein at least one of the behavior anomalies comprises a deviation in a behavior associated with a given entity of the plurality of entities based on an observed history of the given entity or an observed history of a peer of the given entity.

3. The method of claim 1, wherein determining relations among the entities comprises determining at least one of whether a subset of entities of the plurality of entities are associated in common with a data center or whether the subset of entities are associated in common with a project.

4. The method of claim 1, wherein:
   the entities comprise a plurality of users and a plurality of computers; and
   determining the relations comprises determining whether a given user of the plurality of users is connected to a given computer of the plurality of computers based at least in part on whether the user has logged into the given computer.

5. The method of claim 1, wherein:
   the entities comprise a plurality of internet protocol (IP) addresses and a plurality of computers; and
   determining the relations comprises determining whether a given IP address of the plurality of IP addresses is connected to a given computer of the plurality of computers based at least in part on whether the IP address has been assigned to the given computer.

6. The method of claim 1, further comprising:
   selectively grouping the behavior anomalies into a collection associated with a given entity of the plurality of entities based at least on a predetermined time span.

7. The method of claim 1, wherein selectively reporting the collections comprises:
   determining scores associated with the collections; and
   selectively reporting the collections based at least in part on the scores.

8. The method of claim 7, wherein selectively reporting the collections further comprises:
reporting a given collection of a plurality of collections in response to the determined score associated with the given collections exceeding a threshold.

9. The method of claim 8, further comprising associating a confidence score and a risk score with each anomaly of identified behavior anomalies, wherein determining the scores associated with the collections comprises for a given collection, determining an associated score for the given collection based at least in part on the confidence scores and the risk scores of the anomalies of the given collection.

10. An apparatus comprising:
a processor; and
a memory to store instructions that when executed by the processor, cause the processor to:
receive data identifying behavior anomalies associated with a plurality of entities associated with a computer system;
selectively aggregate the entities into associated groups based at least in part on communications of the entities with a predetermined set of threat actors; and
for a given group, selectively designate the behavior anomalies associated with the entities of the given group for investigation based at least in part on a characteristic of the behavior anomalies associated with the entities of the given group.

11. The apparatus of claim 10, wherein the instructions when executed by the processor, cause the processor to selectively designate the behavior anomalies based at least in part on a ratio of a number of the behavior anomalies to a number of the entities of the given group.

12. The apparatus of claim 10, wherein the instructions when executed by the processor, cause the processor to selectively designate the behavior anomalies based at least in part on behavior anomalies shared in common by the entities of the given group.

13. An article comprising a non-transitory computer readable storage medium to store instructions that when executed by a computer cause the computer to:
receive data identifying a plurality of security threat indicators exhibited by behaviors of a plurality of entities associated with a computer system, wherein a given security threat indicator indicates an activity by an entity of the plurality of entities and is associated with at least one of a confidence score representing a measure of confidence that the activity is associated with a security threat or a risk score representing an impact of the security threat;
selectively group the identified plurality of security threat indicators into collections based at least in part on relations among the entities; and
selectively report the collections to a security analyst.

14. The article of claim 13, wherein the plurality of entities comprises at least one of users, electronic devices, internet protocol (IP) addresses, domain names or uniform resource locators (URLs).

15. The article of claim 13, wherein:
each security threat indicator indicates an activity by an entity of the plurality of entities;
each security threat indicator is associated with a confidence score representing a measure of confidence that the activity is associated a security threat and a risk score representing an impact of the security threat; and
the computer readable storage medium to store instructions that when executed by the computer cause the computer to, for a given collection of a plurality of collections:
determine an aggregate score for the given collection based at least in part on the risk scores and confidence scores associated with the security threat indicators of the given collection; and
selectively report the given collection to the security analyst based at least in part on the aggregate score.

\* \* \* \* \*